United States Patent [19]

Marshall

[11] Patent Number: 5,499,731
[45] Date of Patent: Mar. 19, 1996

[54] SUBSTRATE FOR A MAGNETIC DISC AND MANUFACTURE THEREOF

[75] Inventor: Paul A. Marshall, Chester, United Kingdom

[73] Assignee: Pilkington plc, United Kingdom

[21] Appl. No.: 369,395

[22] Filed: Jan. 6, 1995

[30] Foreign Application Priority Data

Jan. 7, 1994 [GB] United Kingdom ............ 9400259

[51] Int. Cl.⁶ .................. B44C 1/22; B41M 1/10
[52] U.S. Cl. .................. 216/22; 216/49; 216/50; 216/104; 101/170
[58] Field of Search .................. 216/22, 42, 49, 216/50, 109, 100, 104; 252/79.3; 101/150, 163, 175

[56] References Cited

U.S. PATENT DOCUMENTS

| | | | |
|---|---|---|---|
| 4,544,443 | 10/1985 | Ohta et al. | 156/643 |
| 4,655,876 | 4/1987 | Kawai et al. | 156/643 |
| 4,818,648 | 4/1989 | Ohta et al. | 430/17 |
| 4,833,001 | 5/1989 | Kijima et al. | 428/141 |
| 4,869,778 | 9/1989 | Cote | 156/635 |
| 4,879,457 | 11/1989 | Ludden | 235/487 |
| 4,983,246 | 1/1991 | Bunting | 156/240 |
| 4,996,622 | 2/1991 | Takatsuki et al. | 360/135 |
| 5,059,279 | 10/1991 | Wilson | 156/651 |
| 5,070,425 | 12/1991 | Inumochi | 360/135 |
| 5,082,709 | 1/1992 | Suzuki et al. | 428/64 |
| 5,087,481 | 2/1992 | Chen et al. | 427/129 |
| 5,127,330 | 7/1992 | Okazaki | 101/450.1 |
| 5,131,977 | 7/1992 | Morizane et al. | 156/646 |
| 5,166,006 | 11/1992 | Lal et al. | 428/612 |
| 5,220,725 | 6/1993 | Chan et al. | 29/874 |

FOREIGN PATENT DOCUMENTS

| | | |
|---|---|---|
| 0092988 | 11/1983 | European Pat. Off. . |
| 0228814 | 7/1987 | European Pat. Off. . |
| 0310397 | 4/1989 | European Pat. Off. . |
| 0319350 | 6/1989 | European Pat. Off. . |
| 3824889 | 1/1990 | Germany . |
| 2200595 | 8/1988 | United Kingdom . |
| 2259060 | 3/1993 | United Kingdom . |

OTHER PUBLICATIONS

Patent Abstracts of Japan, Pub. No. JP 3281790.
Derwents Patent Abstracts, Week 8148, Abstract of JP–A–49 128 009.
Patent Abstracts of Japan, vol. 9, No. 304, Nov. 1985, Abstract of JP–A–60 136 035.
Patent Abstracts of Japan, vol. 13, No. 98, Mar. 1989, Abstract of JP 63 279 425.
Patent Abstracts of Japan, vol. 14, No. 389, Aug. 1990, Abstract of JP 2 146 109.
Patent Abstracts of Japan, vol. 13, No. 27, Jan. 1989, Abstract of JP 63 225 919.
WPI/Derwents Publications Abstracts, Section Ch, Week 7732, Abstract of JP 52 076 114, Jun., 1977.

Primary Examiner—R. Bruce Breneman
Assistant Examiner—Anita K. Alanko
Attorney, Agent, or Firm—Burns, Doane, Swecker & Mathis

[57] ABSTRACT

The present invention relates to a process for producing a substrate for a thin film magnetic data storage disc, the process including the steps of:- (a) providing a substrate; (b) printing a masking pattern of ink dots onto at least a portion of the surface of the substrate by an offset printing process in which the ink to form the masking pattern is transferred from a printing plate to the substrate by an offset printing member and wherein on transfer from the printing plate to the offset member the ink fragments into the ink dots; and (c) etching the unmasked surface of the substrate thereby to texture the substrate surface. The present invention also relates to a substrate for a thin film magnetic data storage disc, the substrate having a roughened surface composed of peaks separated by valleys produced by preferential area etching, the peaks being grouped into a plurality of substantially circular sub-arrays with the sub-arrays forming a regular pattern.

14 Claims, 4 Drawing Sheets

SUBSTRATE FOR A MAGNETIC DISC AND MANUFACTURE THEREOF

BACKGROUND TO THE INVENTION

The present invention relates to a substrate for a thin film magnetic data storage disc and to a process for producing such a substrate. The substrate may comprise a glass disc, a metal disc or a glass disc having metal surface layers.

Thin film magnetic discs for storing data are known in which a magnetic recording medium has been deposited onto a glass or metal substrate. In use, the magnetic disc is disposed in a magnetic disc drive unit which utilises a magnetic head for reading and writing information from and onto the disc. Prior to the reading and writing operation, the disc is stationary and the head is in contact with the magnetic recording medium on the disc. In the reading and writing operation, the disc is driven to rotate at a predetermined speed relative to the head which can be moved radially relative to the disc. The head is spaced a very small distance from the magnetic recording medium and is adapted to read information from and write information onto the magnetic recording medium at the desired place on the magnetic recording medium. After the reading and writing operation, the rotation of the disc is terminated and the head is permitted to return to the initial configuration wherein the head contacts the disc. This method of operating a disc is known in the art as a contact-start-stop (CSS) method. It is known that such magnetic disc drive units suffer from the problem of "stiction" or static friction which exists between the head and the magnetic recording medium on initiation or termination of the reading or writing operation. This stiction can cause wear of the head and of the medium and thus can reduce the life time of the magnetic disc drive unit. The tendency for stiction to occur increases with increasing smoothness of the magnetic recording medium.

The glass or metal substrate can have such a smooth surface that the overlying magnetic recording medium which has a correspondingly smooth surface is so smooth that the surface area of the medium actually contacting the static recording head is sufficiently large whereby the stiction problem can be encountered during use of the drive unit. This can cause premature failure of the drive unit and/or the media as described above.

It is known from U.S. Pat. No. 4,833,001 to provide a glass substrate for a magnetic disc with an isotropically toughened surface. The surface toughening is achieved by chemical etching of the glass surface either by a gas containing hydrogen fluoride or by an aqueous solution containing a fluorine compound. U.S. Pat. No. 5,087,481 discloses a method for texturing a magnetic disc silicate glass substrate in which prior to surface roughening or "texturing" of the disc, this being achieved by chemical etching, the glass surface is subjected to a chemical or gentle mechanical polishing step to remove microcracks or scratches in the disc surface. However, we have found that the use of chemical etching of the disc surface has the disadvantage that a fully isotropic micro-textured surface can be difficult to achieve.

It is known to texture the surface of a metal substrate by mechanically abrading the surface after an initial polishing step. The abrasion is carried out either by an abrasive tape or by lose abrasive material. However, we have found the the use of mechanical abrading of the disc surface has the disadvantage that a fully isotropic micro-textured surface can be difficult to achieve.

SUMMARY OF THE INVENTION

The present invention aims to provide a method of producing a substrate for a thin film magnetic data storage disc, the substrate having a textured or roughened surface, which has advantages over these known processes.

Accordingly, the present invention provides a process for producing a substrate for a thin film magnetic data storage disc, the process including the steps of:- (a) providing a substrate; (b) printing a masking pattern of ink dots onto at least a portion of the surface of the substrate by an offset printing process in which ink to form the masking pattern is transferred from a printing plate to the substrate by an offset printing member and whereby on transfer from the printing plate to the offset printing member the ink fragments into the ink dots; and (c) etching the unmasked surface of the substrate thereby to texture the substrate surface.

The present invention further provides a substrate for a thin film magnetic data storage disc, the substrate having a roughened surface composed of peaks separated by valleys produced by preferential area etching, the peaks being grouped into a plurality of substantially circular sub-arrays with the sub-arrays forming a regular pattern.

The substrate may comprise a glass disc, a metal disc, or a glass disc carrying at least one metal surface layer.

BRIEF DESCRIPTION OF THE DRAWINGS

Embodiments of the present invention will now be described by way of example only, with reference to the accompanying drawings, in which.

DETAILED DESCRIPTION OF THE PREFERRED EMBODIMENTS

Figure 1:
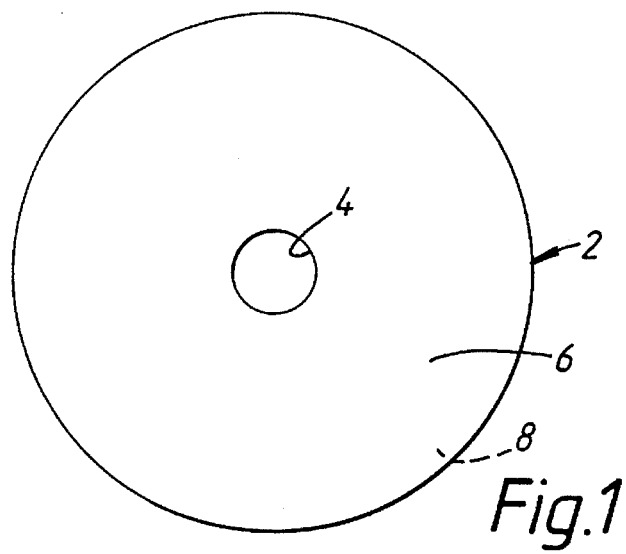
FIG. 1 is a plan view of a glass disc to form a glass substrate for a thin film magnetic data storage disc in accordance with an embodiment of the present invention.

Referring to FIG. 1, there is shown a glass disc 2 having a central circular hole 4 to form a glass substrate for a thin film magnetic data storage disc in accordance with an embodiment of the present invention. The glass disc 2 is typically composed of a soda lime silicate float glass but, alternatively, the glass disc 2 may be composed of a sheet glass. The glass disc 2 may be composed of other glass compositions such as an alkali-containing borosilicate glass, an alkali-containing aluminoborosilicate glass, an alkali-aluminosilicate glass, an alkali-free glass; an air-cooled or liquid-cooled toughened glass, a chemically strengthened or toughened glass or a crystallised glass i.e. a glass ceramic. In this specification, the term "glass" encompasses all of these types of glass or glass ceramics. In accordance with an embodiment of the present invention, typically the glass composition is a standard soda lime silicate float glass composition such as $SiO_2$ 70.5–73.0 wt %, $Al_2O_3$ 0.5–2.0 wt %, CaO 7.5–10.0%, $Fe_2O_3$ 0.05–0.15 wt %, MgO 3.5–5.5 wt %, $Na_2O$ 12.5–15.0 wt %, $K_2O$ 0.05–0.5 wt %.

The initial polished, blemish free, flat and parallel float glass disc typically has a surface roughness average (as hereinafter described) of 0.5 to 1.0 nm. Initially, the glass is polished, for example by a mechanical or chemical polishing process, in order to remove surface damage from the opposed disc surfaces 6,8 which are ultimately to carry the magnetic recording medium. The polishing process removes the outer glass surface because it is that surface which tends to have defects such as microcracks present therein. The amount of material which is removed during the polishing step depends on the initial degree of surface damage and also on the initial thickness of the glass disc 2. A typical thickness of the outer glass surface which is removed on polishing is between 10 and 50 microns. The polishing step also smooths out the surfaces 6,8 of the glass disc 2. Typically, the polished surfaces have a surface roughness average of 0.5 to 1 nm, more particularly from 0.5 to 0.8 nm.

The average surface roughness parameter can be determined from measurement of the surface of the glass, for example, by means of an optical or stylus profilometer such as that made by Wyko Inc. of Arizona, U.S.A. and sold under model No. TOPO-3D or the Talystep profilometer made and sold by Rank Taylor Hobson of Leicester, England. Such profilometers can measure the profile of the surface of the substrate, the surface of which is composed of a series of peaks and valleys. The surface finish can be defined by a "mean line" which is a line which bisects the peak/valley profile such that over any given cross sectional length the area of the peaks above that line is equal to the area of the valleys below that line, with both areas being a minimum. The surface roughness average (which has also been referred to in the art as the arithmetic average or the center line average), is the arithmetic average of the distance of the roughness profile from the mean line over a given assessment length of the mean line or for a given number of assessment points along the mean line. The roughness average is statistically a stable parameter and is good for representing the roughness of random-type surfaces. The roughness average is also easy to implement into known profilometer instrumentation.

The polished glass is then cleaned by washing with an aqueous detergent and deionised water and then the glass disc 2 is dried in air or nitrogen gas.

Preferably, the glass disc is chemically strengthened. It is preferred that the chemical strengthening operation, which is well known per se to the man skilled in the art, is carried out at this stage, i.e. before printing and etching of the disc. However, the chemical strengthening operation could alternatively be carried out after the printing and etching steps. The glass disc is cleaned after the chemical strengthening step in the same manner described above in which the glass disc is cleaned after the polishing step.

Figure 2:
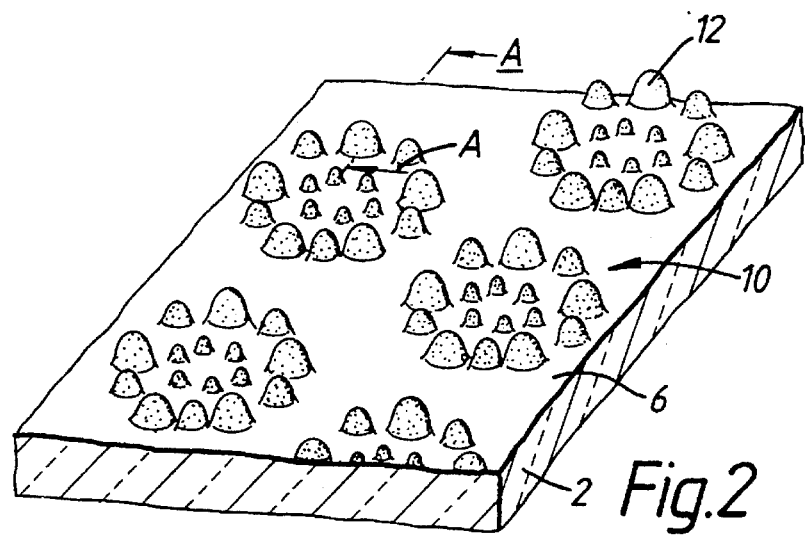
FIG. 2 is a schematic perspective view of the surface of the glass substrate of FIG. 1 which has been printed with an ink dot pattern in accordance with an embodiment of the present invention.
Figure 3:
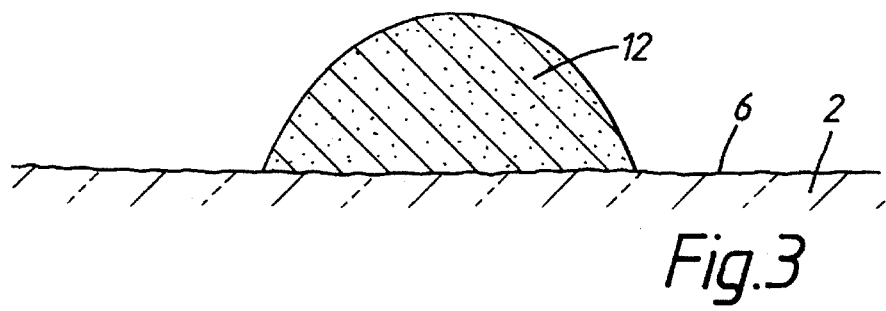
FIG. 3 is an enlarged cross-section on line A—A through an ink dot and the substrate shown in FIG. 2.

Referring to FIG. 2, the cleaned glass disc 2 is then printed in a manner described hereinbelow with a pattern 10 of ink onto each glass surface 6,8 (simultaneously or successively) of the disc 2. In this specification the term "printing" is intended to refer to an offset printing process in which ink is printed onto the substrate surface by being transferred from a printing plate to a substrate by an offset printing member; the printing process may be a gravure printing process, for example an offset gravure process such as pad printing or a lithographic printing process such as offset lithography. The term "printing" does not encompass photolithographic techniques.

In the illustrated embodiment, the pattern 10 is composed of ink dots 12. As is described in greater detail hereinbelow, each ink dot 12 comprises part of a sub-array 14 of ink dots 12, each dot 12 of the sub-array having been formed by fragmentation of a larger ink droplet originally on the printing plate during the printing process. Each droplet breaks up under the effect of surface tension into a number of smaller ink dots, and such break up generally forms a circular sub-array of ink dots 12 surrounding the centre of the original droplet. The original droplet may have a diameter of from 5 to 25 microns, more preferably 5 to 17 microns and the sub-array may have a diameter typically ranging from 35 to 40 microns. Typically, the original droplet breaks up or fragments into from 20 to 50 smaller ink dots. The sub-arrays form the ink dot pattern 10. In FIG. 2, as in FIGS. 3 to 7, the vertical extent of the printed dots 12, and the resultant surface of the glass disc 2, are greatly exaggerated with respect of the horizontal extent (typically by a factor of 100 to 1000 to 1) for the sake of clarity of illustration. As will be seen with reference to FIG. 2, in the preferred embodiments the ink dot pattern 10 is printed in a regular array of sub-arrays 14 which may either be an orthogonal array, which is preferably a square array, or a non-orthogonal array, which may be a triangular array. Alternatively, the pattern 10 may be circular with the sub-arrays 14 being formed either in concentric circles or in radial lines. A triangular pattern can provide a high density array of ink dots. The ink dot pattern 10 is determined by the original pattern on the printing plate. For clarity of illustration, in FIGS. 2, 4, 5 and 7 only some of the dots, and resultant peaks of each sub-array are shown.

In plan view the dots may be circular, elliptical, rectangular with rounded corners or any other shape. Preferably, the dots are approximately circular in plan. Preferably, the pitch between adjacent sub-arrays 14 ranges from 5 to 100 microns, with a typical value being from 15 to 65 microns. The pitch between the adjacent sub-arrays 14 is the distance between the centres of the adjacent sub-arrays 4. The pitch between adjacent ink dots 12 in each sub-array 14 is preferably from 0.5 to 3 microns. When the ink dots 12 are approximately circular in plan they preferably have a base diameter less than 5 microns with a typical diameter being between 1 and 5 microns. The thickness of the ink dots 12 in the vertical direction is not particularly critical. The thickness is controlled so that the ink dot is of sufficient thickness so as to act as a mask during a subsequent etching process which is described hereinafter. Typically, the ink dots 12 are around a few microns thick, for example up to about 10 microns thick, more preferably from 2.5 to 10 microns thick.

Figure 4A:
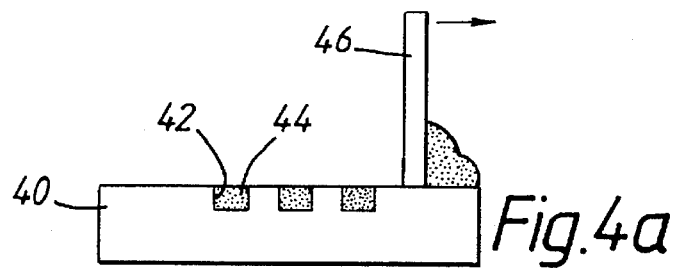
FIGS. 4a to 4e illustrate schematically a sequence of steps in a pad printing process for printing the ink dot pattern of FIGS. 2 and 3.
Figure 4B:
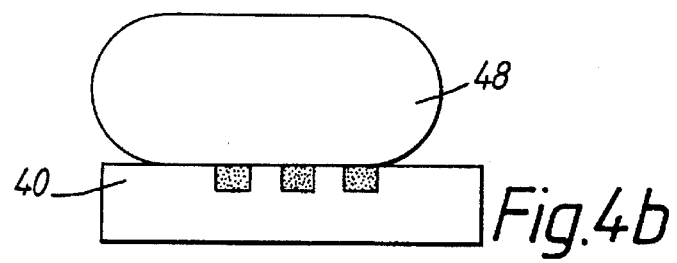

A variety of offset printing processes may be employed, such as gravure or lithography. However, a preferred method of printing the matrix of ink dots 12 onto the glass substrate 2 uses an offset gravure method of printing known in the art as "pad" printing. This is broadly described as follows. As shown in FIG. 4a, the process uses a printing plate 40 which has etched into the surface thereof an array of pits 42 which matches the pattern of sub-arrays 14 which is required to be printed. The pits may typically have an average diameter of around 17 microns, although the pits may preferably range from around 5 to 25 microns in average diameter. The pits 42 are filled with ink 44 using, for example, a doctor blade 46, so as to form an ink droplet pattern corresponding to the array of etched pits 42. The droplets preferably have an average pitch of from 15 to 65 microns and an average diameter of from 5 to 25 microns, typically around 17 microns. The volume of the pits defines the droplet volume which in turn determines the overall size of the fragmented ink dots. The smaller the pit volume, the smaller the area of each sub-array of printed dots. Then the ink droplets 44 are allowed to dry by a controlled amount so as to render the ink tacky. As shown in FIG. 4b, a pad 48 is pressed against the pattern of ink droplets 44 on the printing plate 40. The ink droplets 44 adhere preferentially to the pad 48 so that, when the pad 48 is removed from the plate 40, the ink remains adhered to the pad 48 and is removed from the plate 40.

Figure 4C:
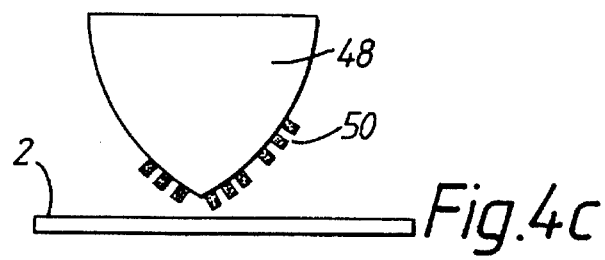
Figure 4D:
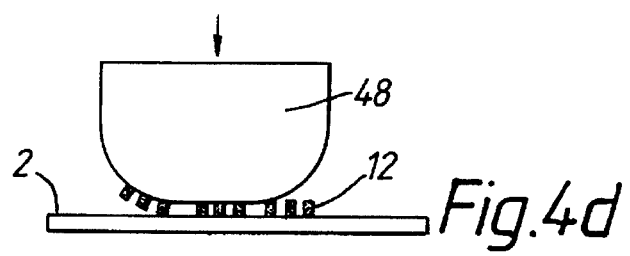
Figure 4E:
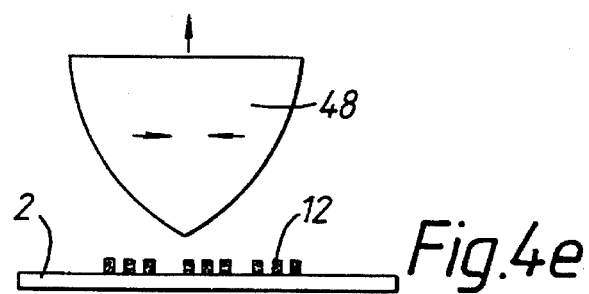

The ink and the material of the pad 48 are selected so that the ink is unable to wet the pad evenly as a result of the combination of relatively low viscosity of the ink and limited wettability of the pad. Accordingly, under the effect of surface tension, each ink droplet 44 fragments or breaks up on the surface of the pad into groups of smaller ink dots 50, each group of ink dots 50 ultimately forming a sub-array 14 of ink dots 12 on the substrate surface. As is shown in FIGS. 4c and 4d, the pad 48 is then pushed down onto the substrate 2 and the ink dots 50 are transferred onto the substrate 2. The pad 48 is then removed depositing dots 12 in the desired pattern on the substrate 2.

The printing plate 40 is preferably formed as follows. A "screen" is formed which can be either an acetate sheet with the images of the dots burned on it using a laser or a glass photomask (such as those available in commerce from the company Compugraphics of Glen Rothes, Scotland) which is formed with the desired pattern upon it. The screen is placed in contact with a photoresist layer coated on a metal plate, which may be of the type sold under the trade name "Nyloplate" sold by the firm Teca-Print UK of Sheffield, England. The photoresist is then exposed to a source of ultraviolet radiation. When large dot sizes are required, an acetate screen and a multipoint UV source are preferably used and when smaller dot sizes are required, the dots are preferably formed using a glass photomask and a single point UV source, which can produce better defined dots.

The photoresist layer is then developed by a known process so as to leave an array of pits in the resist layer. The photoresist layer can constitute the upper surface of printing plate 40 shown in FIG. 4a, or alternatively, the pits 42 can be etched completely through into the metal plate carrying the photoresist layer. In this embodiment, the photoresist layer is removed completely after etching of the pits 42 into the metal layer. This leaves a much more durable printing plate.

The printing plate 40 is then mounted on a pad printing machine, which is known in the art, a suitable machine being sold by Teca-Print under the trade name TPX350, and is flooded with ink thereby filling the array of pits 42. The pits may have an average diameter of from 5 to 25 microns, typically around 17 microns. The excess ink is then scraped off automatically, back into a reservoir, by the doctor blade 46. Suitable printing plates are sold by Teca-Print under the product number 2707/1212 or Nicholl Graphics, UK under the product number KM73.

The printing ink which is employed is of a type which is suitable for application to glass. The printing ink should be resistant to the selected etchant in the etching step but be cleanly removable from the glass surface subsequent to the etching step. The ink is preferably particulate-free but the ink may incorporate non-particulate colouring agents. However, the ink may for some applications contain a fine particulate pigment. The ink possesses a surface tension which enables extremely fine dots 12 to be printed on the surface of the glass substrate. Preferably the ink is a resinous ink. A suitable particulate-free ink is a resinous non-hardened ink of a group of inks sold by AM Ramp & Co. GmbH of Eppstein, Germany under the designation RUCO 10-KK, a particular ink being RUCO 10-KK Code LVB 18830, having red dye but no particulate pigment and having a viscosity of 80 Poise. Another suitable resinous ink is sold in commerce by Marabu Werke GmbH & Co. of Tamm, Germany under the trade name MARABU GL. However other similar resinous inks may be employed. Such a resinous ink may be removed from the glass surface after the etching step by a solvent. Suitable solvents are butanone (ethyl methyl ketone), N-methyl-2-pyrrolidone, cyclohexanone, acetone, methanol/methylene chloride, or 1,1,2 trichloroethylene.

An example of another ink which can be employed in accordance with the present invention is an alkali removable acid etch resist ink, e.g. a photoresist, which is manufactured by Sericol Group Limited of London UK and is sold under the trade name PC966. That ink is sold commercially as a high definition screen ink for use in the production of printed circuit boards. The ink is generally used in combination with a thixotropic reducer for maintaining detailed printing. The photoresist may be diluted with a suitable thinner, for example to a photoresist/thinner ratio of around 1:30.

If desired, the adhesion of the ink onto the glass can be controlled by the incorporation into the ink, or prior treatment of the glass, with a silane compound. This improves the adhesion between the ink and the glass.

Alternatively, the ink may be bonded effectively to the glass by including a hardener in the ink mix. Certain inks are known in the art as being suitable for bonding to glass. Such inks are two-part inks, one part of the ink being the non-hardened resinous ink and the other part being the hardener. In the case of RUCO 10-KK ink identified above, the hardener 37172 (also sold by AM Ramp & Co. GmbH) is preferred, preferably in an amount about 20% by weight of the ink. In certain applications, the degree of bonding between the glass and the ink can be too strong and so a smaller amount or even no hardener is added to the ink. Alternatively, a single component ink may be employed. The ink may be heated on the substrate in order to increase the resistance of the ink to the etching solution. The heating is controlled so as to provide sufficient etch resistance but without increasing the bonding between the ink and the substrate so much that the ink cannot be removed from the substrate by a solvent following the etching step. The ink may be baked or cured for example by heating using a fan oven, microwave oven or any other means of treating the samples with electromagnetic radiation suitable for the curing/baking of printing inks, in order to improve the etch resistance. When a RUCO 10-KK ink is employed, the ink tends not to be completely removable by organic solvents after baking. If the RUCO 10-KK ink is heated to a temperature of from 120° to 140° C. for a period of around 1 hour, a small amount of resin cross-linking occurs and some of the ink can be removed by an organic solvent, but at higher baking temperatures the resin becomes fully cross-linked and cannot be removed by organic solvents. The ink may alternatively be removed from the glass after etching by heating the disk in air, for example for a period of at least 40 minutes at a temperature of around 430° C.

Figure 5:
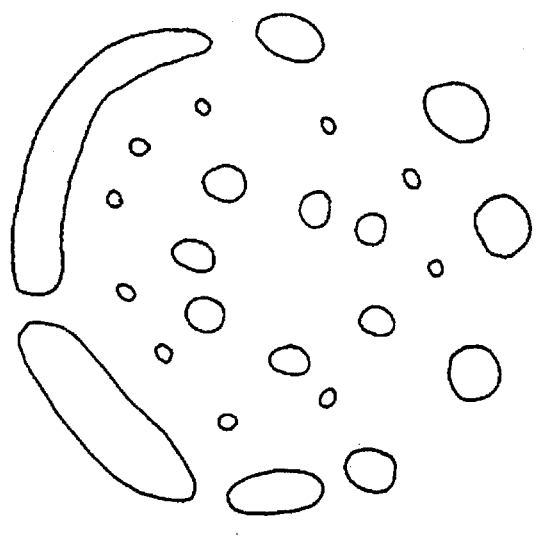
FIG. 5 shows a partly fragmented ink dot pattern.
Figure 6:
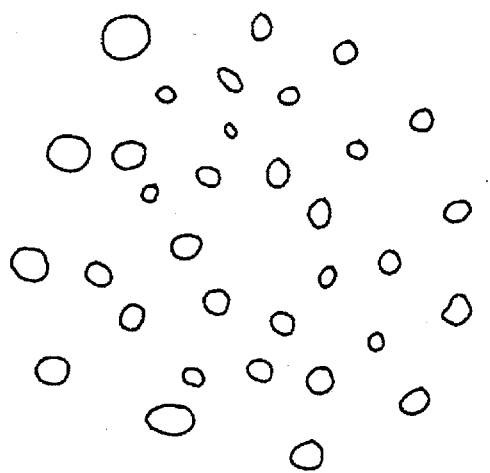
FIG. 6 shows a fully fragmented ink dot pattern.

The ink viscosity which influences the degree of fragmentation is adjusted as necessary by dilution with an appropriate amount of a suitable thinner such as the thinner sold by AM Ramp & Co. GmbH under the trade name Ruco 100 VR 1271. Typically, the viscosity of the ink may varies with flow times from 20 to 40 seconds, more typically from 24 to 31 seconds, at 21° C. as measured using a Flow Cup, No. 3, measurement method in accordance with BS 3900/ISO 2431. The ink/thinner ratios are selected to achieve such ink viscosities, the viscosity ranges with flow times of 24 to 31 seconds specified above broadly corresponding to an ink/thinner volume ratio of from 1:5 to 1:20 when RUCO inks and thinners are employed. The viscosity of the particular ink employed is varied for the selected ink and the selected pad material so as to ensure the desired degree of fragmentation of the ink when it is transferred onto the pad surface. Using an ink/thinner volume ratio of from 1:5 to 1:20 as specified above, it is possible that the ink dots are only partially fragmented i.e. some large bodies of ink remain which are not fragmented into the desired smaller dots. A partially fragmented ink dot pattern is shown in FIG. 5 and a fully fragmented ink dot pattern is shown in FIG. 6. The improved pattern illustrated in FIG. 6 may more reliably be obtained by using ink/thinner volume ratios of from 1:25 to 1:100, more preferably from 1:25 to 1:40, thus widening the printing conditions utilisable in the present invention. A most preferred ink/thinner volume ratio is from 1:30 to 1:40, the thinned inks having a viscosity with flow times of 66 seconds and 60 seconds at ratios of 1:30 and 1:40 respectively as measured using the Ostwald U-Tube Viscometer Technique using C-category tubes, a test known to those skilled in the art.

The pad 48 comprises a specially shaped silicone rubber pad, and suitable pads are available in commerce from Teca-Print UK mentioned above, the company F. Schmid of Cormoret, Switzerland, Tampographics of Rushden, Northants, UK or Tampo Supplies of Teddington, Middx, UK. The pad has the property of being relatively deformable and so is able to contact all the ink droplets 44 in the holes of the printing plate 40. In the printing machine, such as that available in commerce from Teca-Print UK referred to hereinabove, the pad 48 is carefully brought into contact with the array of ink droplets 44. The printing machine is adjusted so as to apply the pad over the required surface of the printing plate and at the right pressure enabling it to pick up the whole array of ink droplets. The silicone rubber material of the pad, when used with the low viscosity ink is not fully wettable because of the nature of the pad material and this causes the droplets of ink to fragment as described above under the effect of surface tension in the ink surface. The pad 48 is then brought by the machine into contact with the glass disc substrate and the droplets are deposited onto the glass disc substrate in the defined array. Each sub array of droplets formed from each drop associated with each pit preferably has a diameter of around 35 to 40 microns, which sub-array has been formed as a result of ink fragmentation.

The present inventors have found that the pad printing process illustrated in FIGS. 4a to 4e does not always put sufficiently circular dots of ink down onto the glass substrate. For example, the dots of ink may have an eliptical or otherwise non-circular configuration. The present inventors have found that more circular dot shapes can be obtained if the printing ink contains only fine particulate material or more preferably no particulate material. The present inventors have further found that after the printing step, if the temperature of the printed ink dots is raised above 80° C., more particularly during the drying stage after the printing step, then the ink dots become more rounded. It is believed that during the heating step, the ink becomes sufficiently fluid so that the surface tension forces are strong enough to cause the ink dot to consolidate and become significantly more circular in plan. This rounding effect has been seen using the ink Ruco 10 KK referred to above. This ink contains no particulate pigment and is used without a hardener. It is believed that without a pigment, it is possible for the ink to become more mobile at a higher temperature and consequently readily spherodises so as to become rounder on heating.

The rounding of the printing dots provides a technical advantage in the final printed glass substrate. This is because when the dots are more circular in plan in the printed structure then the dots will etch to give a more uniform series of textured peaks in the glass substrate. This can significantly assist in the consistency of the flying characteristics of the magnetic disc head.

Following the printing operation, the glass substrate 2 is then subjected to an etching process in which the surface regions of the glass substrate 2 which are not directly covered by the masking array 10 of printed ink dots 12 are etched to a controlled depth in order to roughen or texture the surface of the glass substrate 2 to the desired roughness without substantially changing the overall flatness of the disc. The etching is carried out either by chemical etching, for example by the use of wet chemical etching, typically by using aqueous solutions of hydrogen fluoride, ammonium bifluoride or fluorosilicic acid, each optionally with an addition of sulphuric acid; or by reactive ion plasma etching. The etching step may utilise agitation of the liquid etchant, for example, by ultrasonic vibration, in order to accelerate the etching of the glass.

The etching is preferably carried out so that a feature height of 15 to 20 nm is achieved. Feature heights of less than 5 nm are difficult to distinguish against the background surface.

Figure 7:
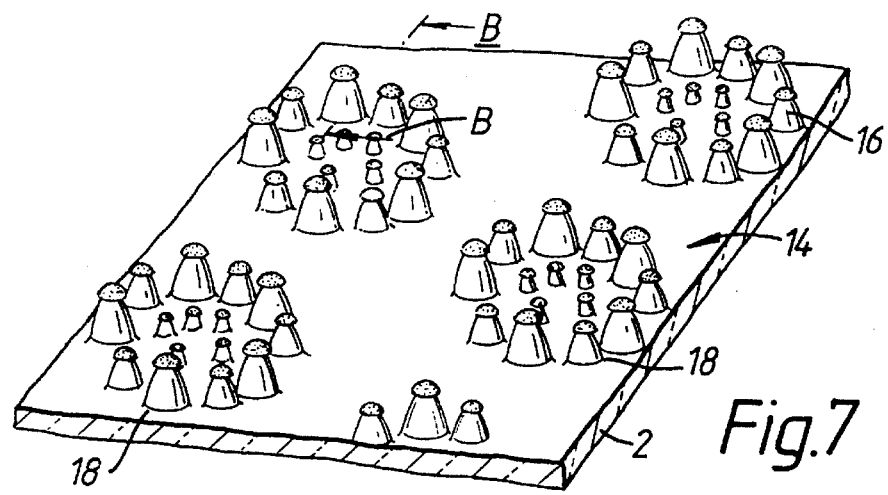
FIG. 7 is a schematic perspective view of the glass substrate of FIGS. 2 and 3 after an etching step in accordance with the embodiment of the present invention.
Figure 8:
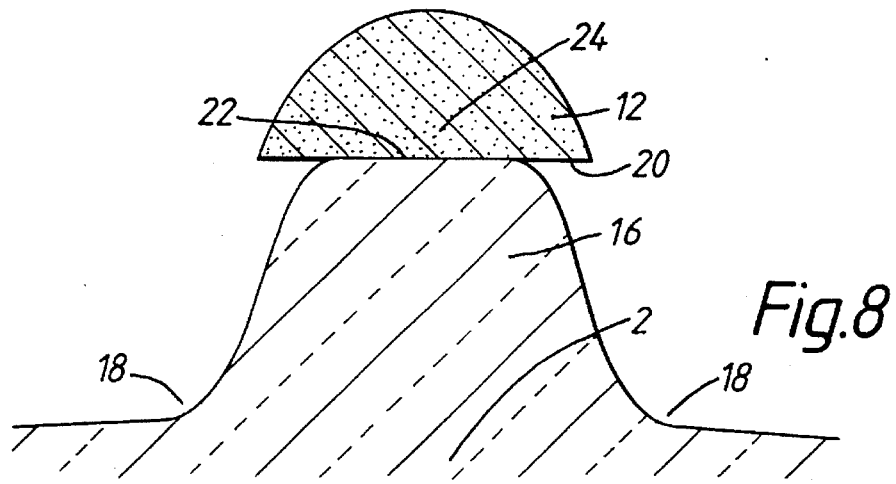
FIG. 8 is an enlarged cross-section on line B—B through an ink dot and the underlying glass surface of the etched substrate shown in FIG. 7.

FIGS. 7 and 8 show the glass substrate 2 after the etching step.

It has been found that when the ink dots are printed with inks which have been significantly diluted by the addition of ink thinners as described hereinabove, it is possible that a thin layer of less than about 1 micron in thickness of etch resistant material can be deposited between the ink dots. That thin layer consists of ink deposits and silicone oils which have been released from the pad surface during the printing step. The etch resistant properties of the thin layer can increase following baking of the ink at temperatures of from 140° to 160° C. and the existence of the thin layer can act to delay the onset of etching of the fragmented dot features. This is disadvantageous because it leads to non-uniform etch heights being produced in the resultant glass surface.

In order to overcome this technical problem, it has been found that ink dots baked at a temperature of from 140° to 160° C. can be pre-treated before the etching step. The pre-treatment consists of subjecting the ink dots/glass surfaces to be etched to a 5% by volume sodium hydroxide solution for a period of from 4 to 10 minutes. This acts to remove the etch resistant layer between the ink dots, but without removal of the fragmented ink dots themselves. This provides the advantage that any delay in the onset of etching is eliminated.

Referring to FIGS. 7 and 8, in the illustrated embodiment, the unmasked surface of the glass substrate 2 has been etched by an aqueous solution of hydrogen fluoride and ammonium fluoride. Typically, the solution contains, from 0.01 to 0.1 vol.% HF with an $NH_4F$ concentration about ten times that of the HF concentration, a particularly preferred etchant concentration being from 0.02 to 0.04 vol % HF and around 0.2 vol % $NH_4F$. The etch depth can be controlled depending on the selected etch temperature, etch time and etchant concentration. The fragmented ink dots formed by the invention are relatively shallow in height and this can lead to difficulties in achieving uniform etching because the etchant can penetrate through the thin ink dots. It has been found that the use of a hydrogen fluoride solution buffered with ammonium fluoride reliably achieves uniform feature heights in the range 15 to 20 nm, which cannot be achieved with hydrogen fluoride alone or hydrogen fluoride in admixture with a mineral acid such as sulphuric acid. It is believed that that etchant achieves uniform feature heights because the diffusion of etchant through the ink has been retarded by the presence of ammonium ions. The etch temperature is preferably from 17° to 30° C. The etch rate varies linearly with temperature, a typical temperature coefficient being 0.3 nm/°C. Generally, the concentration of the etchant, the etch temperature, the etch time and the etch rate are controlled so as to be readily compatible with a production environment. It will be noted from FIGS. 7 and 8 that the unmasked surface of the glass substrate 2 is etched to provide an array 14 of glass peaks 16 on the glass surface, the distribution of the array 14 corresponding to that of the original printed ink dots 12. The peaks 16 are separated by flat bottom valleys 18. The etch process is calibrated by performing a series of prior etch calibration tests so that for any set of process conditions a known etch period can produce the desired degree of etching of the glass surface. At the end of the prior-calibrated etch period the etching process is stopped by removal of the substrate from the etchant solution and washing with water (possibly after immersion in dilute sodium carbonate solution). The etch process is controlled so as to provide in the resultant substrate average peak heights of from 15 to 20 nm. The range of peak heights of the etched surface is typically around +/- 20% of the average peak height. As with the array 10 of printed ink dots 12, the glass peaks 16 are typically around 1 to 5 microns in base diameter and have a pitch which is typically from 15 to 65 microns. The surface roughness of the etched glass substrate 2 can be measured using the optical profilometer refer red to hereinabove.

We have found that by using the masked etching process, particularly by using liquid chemical etchants, the etching of the glass substrate 2 occurs underneath the peripheral edge 20 of the ink dots 12 leading to a detachment of the peripheral edge 20 of the ink dot 12 from the etched glass substrate 2. This is shown in FIG. 8. It is believed that this phenomenon occurs because detachment of the ink dot 12 proceeds at a faster rate in a horizontal direction than the rate at which the glass is etched. Thus, in the final etched microstructure, the ink dots 12 tend partly to be adhered to the glass substrate 2 by their central portion 24. This provides the advantage that the glass peaks 16 on the glass substrate surface are relatively narrow and thus have a good profile for avoiding the stiction phenomenon referred to hereinabove. The smooth physical dimensions of the peaks 16 on the glass substrate 2 give good mechanical strength to the glass substrate 2 by means of a simple masking and etching technique. The simple masking and etching technique can provide a regular array of very fine surface peaks which can provide the desired roughening or texturing required to enable a thin film magnetic data storage disc to be employed without encountering undue stiction problems.

When the etching step employs a liquid etchant, solvents may be present in the liquid etchant which tend to reduce the adhesion of the ink dot to the glass substrate around the periphery of the ink dot leading to enhanced lateral etching of the glass substrate around the periphery of the portion of the glass substrate masked by the ink dot. This leads to control of the texturing of the surface by rounding of the upper surface of the peak produced in the etched microstructure. A suitable solvent for use in the etchant solution is N-Methyl-2 Pyrrolidone (NMP). NMP may be used in the etchant solution at a concentration of up to about 10% by volume. The solvent also reduced the variation in the etched peak heights. The solvent may alternatively be butanone (Ethyl Methyl Ketone).

Figure 9:
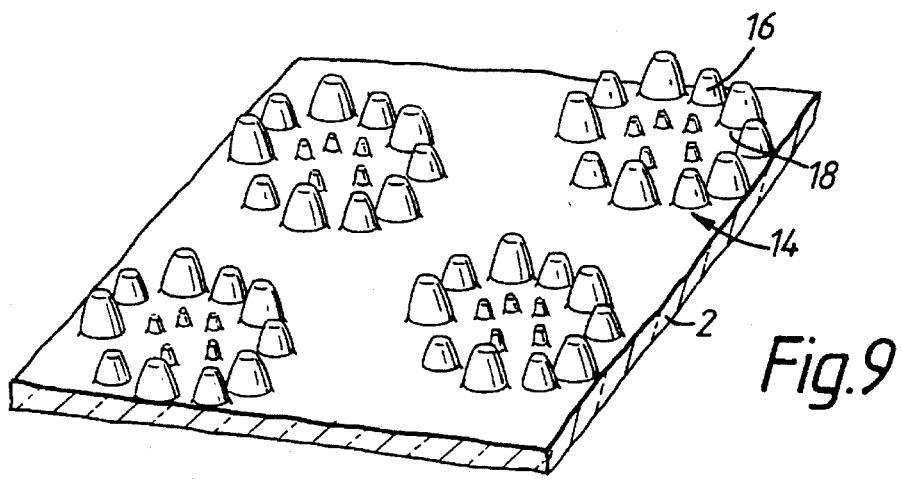
FIG. 9 is a schematic perspective view of the glass substrate shown in FIGS. 7 and 8 after removal of the printed ink dot pattern.

After the etching step, the ink dot 10 array is removed with a solvent in the case of resinous inks or with an alkaline detergent in the case of acid etch resistant inks. The disc is rinsed with deionised water and then dried and the resultant glass substrate surface is illustrated in FIG. 9.

Although an acceptable texture can be obtained by the use of the etching step as a final texturing step of the glass substrate, it is, in accordance with the present invention, possible additionally to incorporate a further post etch treatment of the glass surface so as further to modify the texture of the surface. For example, the etched surface may be treated by very light polishing or by other forms of additional whole surface etching, which may be either wet etching or dry etching. This further processing step may be employed either to roughen the surface or further to smooth the peaks of the texture, depending on the requirements of the particular product which is being manufactured. Thus the man skilled in the art will appreciate that the present invention provides a comprehensive scheme for manufacturing a glass disc substrate for a magnetic disc with the desired texture.

As referred to hereinabove, in accordance with the present invention the glass disc substrate may be chemically strengthened. The chemical strengthening step may be carried out either before or after the texturing process of the present invention. Thus when the chemical strengthening step is carried out before the texturing process, the ultimate glass substrate is still chemically strengthened because the texturing step has not removed all of the chemically strengthened surface of the glass. Alternatively, the chemical strengthening step can be carried out after the texturing step so as to leave at least sufficient residual texture in the surface of the glass substrate.

In accordance with the present invention, either the whole area of the substrate or only selected portions of the area may be textured as aforesaid. Alternatively, the whole disc may be textured but with different areas textured in different ways. Thus the invention may employ limited area texturing for the manufacture of substrates suitable for so-called "contact recording" thin film magnetic data storage discs having a superfine polished surface over the majority of the disc surface. For the manufacture of such discs, the present invention can be employed to texture an annulus, typically 8 mm wide, surrounding the centre hole of the disc. Such textured annulus, in the resultant data storage disc, can be employed as a "parking zone" for the read/write head.

The parking or landing zone can be made by the printing and etching process, with or without masking of the data storage area of the disc, by a gradation in the dot size (diameter) from the outer rim of the annulus to a constant dot diameter towards the centre hole of the disc. This technique provides a gentle ramp to a constant height plateau up which the read/write head can "fly", "land" and "park". The smallest dots of ink can give lower peak heights. The dots may be in rectangular arrays, triangular arrays, concentric ring arrays or continuous concentric rings. The surface roughening of the textured surface thus can be varied to define a plurality of functional zones of the substrate, the zones including a landing zone and a read/write zone, each zone having the desired surface roughening, with optionally there being a graded ramp of roughening between adjacent zones.

Another form of landing zone known as a "down" zone may be produced which is an annular textured area where the peaks of the texture are on the same level as the other areas over which the head flies. These other areas may be adjacent and may be either polished or have a significantly shallower texture than the original "down" zone. This substrate can be produced by protecting all over the adjacent areas with a complete covering mask of, for example, printing ink and then printing the texture pattern on to the "down" zone area. During etching, the texture develops only where the glass is exposed. Subsequent cleaning produces a "down" zone as required with adjacent flat polished areas. This arrangement allows the magnetic head to move laterally across the the disc whilst encountering significantly less upset to its flying characteristics than with the previously described landing zone.

In order to produce a two texture substrate, first the whole disc may be covered with the shallow texture by printing overall with the required array and performing a shallow texturing etch. The ink is then cleaned off. Next, the area required to have the shallow texture on the final disc is completely covered with ink to protect the textured surface during subsequent processing. Then the "down" zone is reprinted with the ink dot array required for that area and etched with the stronger conditions necessary to produce the higher texture of the "down" zone. This superimposes the deeper texture of the "down" zone on the shallower texture already present, which is etched out. Alternatively, each area can be protected whilst the other area is printed and etched to be textured to the required degree.

The present invention has been described above with respect to the manufacture of textured glass substrates. However, the present invention may also be employed to texture metal substrates for thin film magnetic data storage discs. Such metal substrates preferably comprise an aluminium disc coated with a hard layer of nickel/phosphorous alloy. Preferably the etchant used is an aqueous solution of ammonia and the etch is carried out electrochemically. The present invention may also be employed to texture metal substrates wherein metal layers, e.g. of nickel/phosphorous alloy, are carried on a glass disc.

The present invention is further illustrated with reference to the following non-limiting examples.

EXAMPLES 1 to 15

In these examples, ink dots were printed onto glass substrates in accordance with the method of the present invention with the printing being controlled so as to obtain fragmentation of the ink on the printing pads whereby the resultant dots printed on the glass substrate were smaller in size that the droplets present in printing plates. The printing machine consisted of a Teca Print TPX350 and the ink consisted of RUCO 10-KK code LVB 18830 ink as specified above, thinned with the thinner RUCO 100 VR 1271. The printing plates used were the two Teca Print and Nicholl Graphics printing plates sold under the respective product numbers 2707/1212 and KM 73.

The printing in the examples was carried out in the manner specified in Table 1 using the specified pads and the specified ink/thinner ratio. Table 1 specifies the droplet diameter and the pitch in both of the two printing plates employed. The printed inks were subjected to a baking regime at a temperature of from 120° to 140° C. for one hour.

It was observed whether fragmentation occurred. Fragmentation was deemed to have occurred when the droplet broke up into about 20 to 50 features and was deemed to have only partially occured when the droplet broke up into from 2 to 5 features.

It will be seen that fragmentation of the ink droplets into smaller ink dots was achieved using different pads and different ink/thinner ratios. The preferred ink/thinner ratio is lower than 1:5 (i.e. more diluted with thinner) in order to provide fragmentation, although the more dilute the ink, the more reliably fragmentation is achieved.

TABLE 1

| Example | Pad Type | Ink/Thinner Ratio (by Vol) | Printing Plate droplet Diameter/Pitch (Microns) | Fragmentation |
|---|---|---|---|---|
| 1 | Schmid 4/120, White | 1:3.5 | 10/65 | Partial |
| 2 | Schmid 4/120, White | 1:4.5 | 10/65 | Yes |
| 3 | Schmid 4/120, White | 1:10 | 10/65 | Yes |
| 4 | Schmid 4/120, White | 1:20 | 10/65 | Yes |
| 5 | Schmid 4/120, White | 1:20 | 10/30 | Yes |
| 6 | Schmid 4/120, White | 1:20 | 5/15 | Yes |
| 7 | Schmid 7/93, White | 1:20 | 10/65 | Yes |
| 8 | Tecaprint 26, Pink | 1:4.5 | 10/65 | Yes |
| 9 | Tecaprint 26, Blue | 1:4.5 | 10/65 | Yes |
| 10 | Tecaprint 26, White | 1:4.5 | 10/65 | Yes |
| 11 | Tecaprint 597, Green | 1:4.5 | 10/65 | Yes |
| 12 | Tampographics P451/0060 | 1:4.5 | 10/65 | Partial |
| 13 | Tampographics P451/0060 | 1:10 | 10/65 | Yes |
| 14 | Tampo Supplies FP100/0060 | 1:4.5 | 10/65 | Partial |
| 15 | Tampo Supplies FP100/0060 | 1:10 | 10/65 | Yes |

What is claimed is:

1. A process for producing a substrate for a thin film magnetic data storage disc, the process including the steps of:
   (a) providing a substrate;
   (b) printing a masking pattern of ink dots onto at least a portion of the surface of the substrate by an offset printing process in which the ink to form the masking pattern is transferred from a printing plate to the substrate by an offset printing member and wherein on transfer from the printing plate to the offset member the ink fragments into the ink dots; and
   (c) etching the unmasked surface of the substrate thereby to texture the substrate surface.

2. A process according to claim 1 wherein the printing step (b) is carried out by pad printing and the offset printing member is a pad composed of silicone rubber.

3. A process according to claim 1 wherein the masking pattern is formed from a resinous ink which is thinned with a thinner.

4. A process according to claim 3 wherein the ink/thinner volume ratio is from 1:25 to 1:40.

5. A process according to claim 3 further comprising the step of heating the ink masking pattern on the substrate.

6. A process according to claim 5 wherein the heating step is carried out for about 1 hour at a temperature of from 120° to 140° C.

7. A process according to claim 1 wherein the printed dots are printed in groups of printed dots, each group corresponding to a droplet of ink present on the printing plate.

8. A process according to claim 7 wherein the droplets have an average diameter of from 5 to 25 microns.

9. A process according to claim 7 wherein each group has a diameter of from 35 to 40 microns.

10. A process according to claim 7 wherein the groups are separated by an average pitch of from 15 to 65 microns.

11. A process according to claim 7 wherein the printed dots have an average diameter of from 1 to 5 microns.

12. A process according to claim 1 wherein the etching step forms peaks separated by valleys and the average peak width is less than 5 microns.

13. A process according to claim 1 wherein the etching step is a wet chemical etching step using an aqueous solution of hydrogen fluoride and ammonium fluoride as chemical etchant.

14. A process according to claim 13 wherein the etchant contains from 0.02 to 0.04 vol % hydrogen fluoride and around 0.2 vol % ammonium fluoride.

* * * * *